No. 786,888. PATENTED APR. 11, 1905.
G. FINN & A. S. PIKE.
EGG CARRIER.
APPLICATION FILED DEC. 22, 1904.
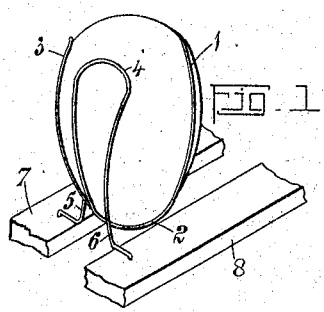
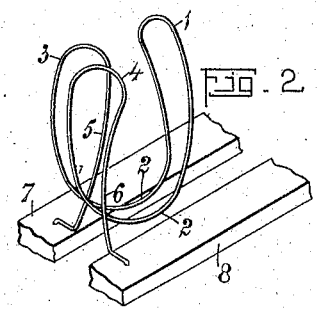
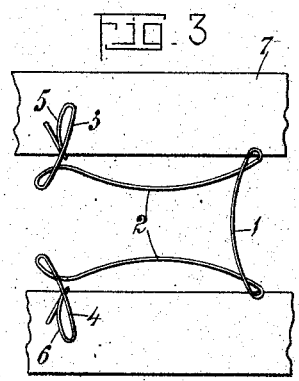
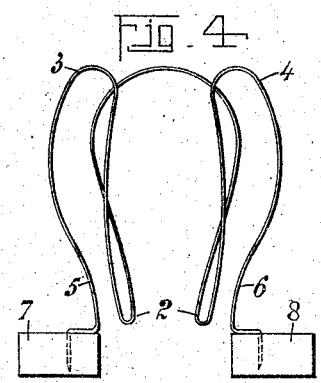
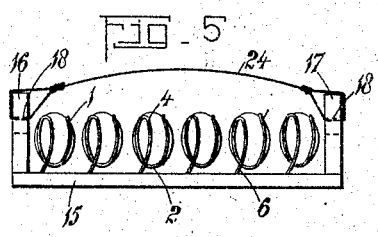
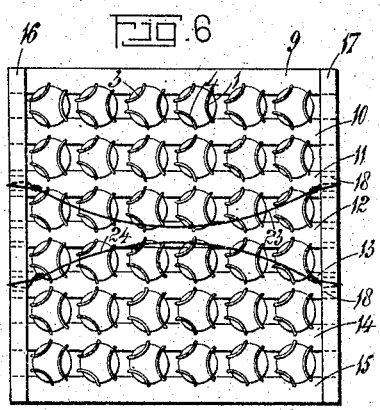
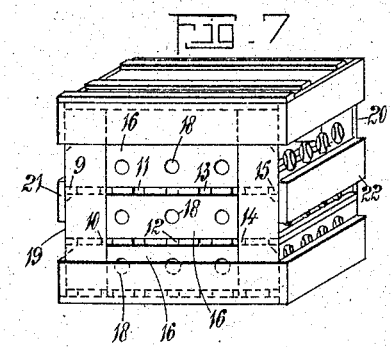
Inventors:—
George Finn
Arthur Seldon Pike No. 786,888. Patented April 11, 1905.

UNITED STATES PATENT OFFICE.

GEORGE FINN AND ARTHUR SELDON PIKE, OF WELLINGTON, NEW ZEALAND.

EGG-CARRIER.

SPECIFICATION forming part of Letters Patent No. 786,888, dated April 11, 1905.

Application filed December 22, 1904. Serial No. 237,923.

*To all whom it may concern:*

Be it known that we, GEORGE FINN, residing at 11 McFarlane street, and ARTHUR SELDON PIKE, residing at 168 Tinakori road, Wellington, in the Provincial District of Wellington, in the Colony of New Zealand, subjects of His Majesty the King of Great Britain and Ireland, have invented a new and useful Improved Egg-Carrier, of which the following is a specification.

This invention relates to the transport and packing of eggs and provides means therefor whereby liability of breakage of the eggs is very much reduced, free circulation of air is permitted around each egg, and facility is given for eye-test inspection to ascertain the condition of each egg.

According hereto each egg is carried in an independent foliated carrier made of one piece of wire bent to form three loops, which fit around the periphery of the egg, which is supported with its major axis vertical. A continuation of the wire forms a pedestal for the carrier, and the ends are respectively secured to two battens, one upon each side of the carrier, the space between the battens being available for eye test of the egg by looking through the egg toward a light placed upon the other side. The peculiar manner of constructing and supporting the carrier gives great resiliency, any shock or jar being taken up by it, while the egg is uninjured. A plurality of the carriers are arranged in rows upon superposed shelves, the bottoms of which are made of battens, and the shelves are carried in a crate the sides of which may be formed of battens to permit the eggs being inspected from the outside.

Referring now to the accompanying drawings, Figure 1 is a side perspective elevation of the carrier carrying an egg. Fig. 2 is a similar view with the egg removed. Fig. 3 is a plan. Fig. 4 is an end elevation. Fig. 5 is a side elevation of a tray. Fig. 6 is a plan thereof, and Fig. 7 a side perspective elevation of a crate containing a number of trays.

Referring first to Figs. 1 to 4, a single piece of wire is bent at its middle to form a loop 1. The ends of the wire are then bent downwardly and laterally to form a curved base 2, upon which rests the end of the egg. Each part of the wire is then bent upwardly and then outwardly and downward, one part forming the loop 3 and the other part the loop 4. The wire is then continued downwardly, forming the legs 5 and 6, which are respectively bent outward near their lower ends to rest upon the battens 7 and 8, the extremities of each part of the wire being bent vertically downward pointed and driven into the respective battens. The wire loops forming the carrier are bent to follow approximately the periphery of the egg and spring tightly upon it, so that the carrier may be inverted or turned upon its side without danger of the egg falling out. The weight of the egg is carried forwardly of the legs, whereby great resiliency is obtained.

Referring now to Figs. 5, 6, and 7, a plurality of the carriers are arranged in rows upon the battens 9, 10, 11, 12, 13, 14, and 15, which are nailed to sides 16 and 17 to form a tray, the sides having holes 18 for ventilation and inspection purposes. The carriers are placed in close proximity without fear of the eggs striking together, owing to the carriers simultaneously springing in the same direction when the trays are dropped or jarred. The trays are arranged one above the other in the crate, (shown in Fig. 7,) having a front 19 and back 20 open (the sides of the tray preventing injury to the eggs) and the sides 21 and 22 formed of battens. The trays may be taken out to permit inspection of the eggs by the eye test, the rows of eggs being inspected one after the other by looking between the battens toward a light placed upon the opposite side of the egg. Wires 23 and 24 may be carried across the tray, if desired, to facilitate its carriage when independent of the crate.

What we claim, and desire to secure by Letters Patent of the United States, is—

1. A carrier for an egg consisting of a single piece of wire bent at its middle to form an egg-supporting loop, the two parts of the wire then bent downwardly and laterally to form a curved base, each part of the wire then bent in an upward curve and then curved outwardly and down to form two other egg-supporting loops, and a leg from each of said last-mentioned loops formed by continuing the wire downwardly, with means for securing each leg to a support, at one side of said curved base, substantially as set forth.

2. For the purpose indicated, a single piece of wire bent to form three independent loops, each loop curved to fit a portion of the periphery of an egg, the wire being continued downwardly from two of said loops to form legs at one side of the center of the device, and battens spaced apart to which said legs are secured one leg to each batten, substantially as set forth.

In testimony whereof we have signed our names to this specification in the presence of two witnesses.

GEORGE FINN.
ARTHUR SELDON PIKE.

Witnesses:
E. S. BALDWIN,
E. P. O'DONNELL.